ates Patent

(12) United States Patent
Majumder

(10) Patent No.: US 10,621,679 B2
(45) Date of Patent: Apr. 14, 2020

(54) MULTI-THREADED TEXT AFFINITY ANALYZER FOR TEXT AND SENTIMENT ANALYTICS

(71) Applicant: Dell Products L.P., Round Rock, TX (US)

(72) Inventor: Prabir Majumder, Plano, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/212,621

(22) Filed: Jul. 18, 2016

(65) Prior Publication Data

US 2018/0018318 A1    Jan. 18, 2018

(51) Int. Cl.
*G06Q 50/00* (2012.01)
*G06F 40/30* (2020.01)
*G06Q 30/02* (2012.01)
*G06Q 10/06* (2012.01)

(52) U.S. Cl.
CPC ............ *G06Q 50/01* (2013.01); *G06F 40/30* (2020.01); *G06Q 10/063* (2013.01); *G06Q 30/02* (2013.01)

(58) Field of Classification Search
CPC .......................... G06Q 30/02; G06Q 10/063
See application file for complete search history.

(56) References Cited

U.S. PATENT DOCUMENTS

| | | | |
|---|---|---|---|
| 2006/0020662 A1* | 1/2006 | Robinson ............... | G06F 15/16 709/203 |
| 2010/0169148 A1* | 7/2010 | Oberhofer ........ | G06Q 10/06311 705/7.13 |
| 2012/0130771 A1* | 5/2012 | Kannan ............ | G06Q 10/06398 705/7.32 |
| 2013/0282594 A1* | 10/2013 | Gaedcke .............. | G06Q 30/016 705/304 |

* cited by examiner

*Primary Examiner* — Matthew H Baker
(74) *Attorney, Agent, or Firm* — Terrile, Cannatti & Chambers; Stephen A. Terrile

(57) ABSTRACT

A method and system are disclosed for analyzing text affinity among a plurality of social media communications, comprising dividing a first social media communication into first plurality of social media communication threads; dividing a second social media communication into a second plurality of social media communication threads; performing a text affinity analysis operation between respective threads of the first plurality of social media communication threads and the second plurality of social media communication threads; and, determining a level of intervention to perform based upon the text affinity analysis operation.

17 Claims, 6 Drawing Sheets

500

| Single-Threaded Analyzer | Chatter 1 | Chatter 2 |
|---|---|---|
| Key Word Counts | 5 | 7 |
| Total Word Counts | 204 | 214 |
| Proportion | 0.02451 | 0.03271 |
| Z-score | -0.50187 | |
| No Significant Difference. Provide | | |

*Figure 5*

Multi-Threaded Text Affinity Analyzer (MTTAA)

| | | Chatter 1 | Chatter 2 |
|---|---|---|---|
| Thread 1 | Key Word Counts | 3 | 1 |
| | Total Word Counts | 68 | 99 |
| Thread 2 | Key Word Counts | 7 | 6 |
| | Total Word Counts | 136 | 115 |
| | Z for Thread 1 | 1.395512 | |
| | Z for Thread 1 | -1.65666 | |
| | Mahalanobis Distance (MD) | 4.691986 | |

- New Chatter has significantly less Negative Sentiment than the Baseline Chatter
- Provide web-based intervention to customer who has created the New Chatter

*Figure 6*

MULTI-THREADED TEXT AFFINITY ANALYZER FOR TEXT AND SENTIMENT ANALYTICS

BACKGROUND OF THE INVENTION

Field of the Invention

Embodiments of the invention relate generally to information handling systems. More specifically, a method and system are disclosed for providing a text affinity analyzer for performing communication analytics.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

These same information handling systems have been just as instrumental in the rapid adoption of social media into the mainstream of everyday life. Social media commonly refers to the use of web-based technologies for the creation and exchange of user-generated content for social interaction. More recently, various aspects of social media have become an increasingly popular for enabling customer feedback, and by extension, they have likewise evolved into a viable marketing channel for vendors.

SUMMARY OF THE INVENTION

A method and system are disclosed for performing communication analytics via a text affinity analyzer. More specifically, in certain embodiments the text affinity analyzer performs a multi-threaded text affinity analytics operation which compares social media communications (e.g., chatters) at a granular level and determines whether a first social media communication is significantly different from a second social media communication (e.g., a baseline posting). Such a text affinity analyzer advantageously saves money in terms of cost avoidance and enhances customer satisfaction.

More specifically, in various embodiments, the disclosure relates to a method and system for analyzing text affinity among a plurality of social media communications, comprising dividing a first social media communication into first plurality of social media communication threads; dividing a second social media communication into a second plurality of social media communication threads; performing a text affinity analysis operation between respective threads of the first plurality of social media communication threads and the second plurality of social media communication threads; and, determining a level of intervention to perform based upon the text affinity analysis operation.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 5 is an example result from a single threaded text affinity analysis operation.

FIG. 6 is an example result from a multi-threaded text affinity analysis operation.

DETAILED DESCRIPTION

Figure 1:
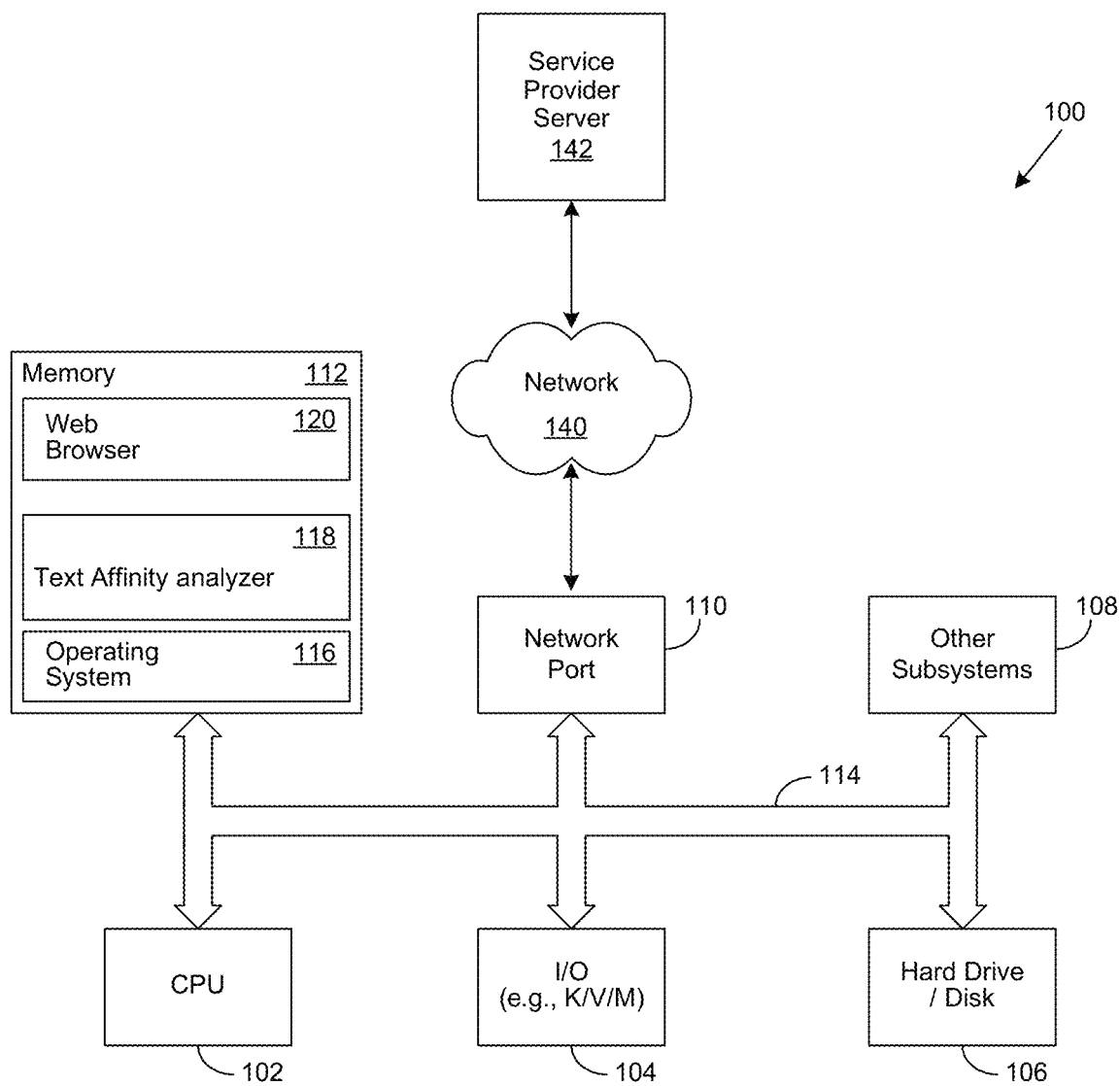
FIG. 1 is a general illustration of the components of an information handling system as implemented in the system and method of the present invention.

Aspects of the present disclosure include an appreciation that articles or feedback posted by customers on social media often provide an increasing role in reflecting a brand of a company as well as the value of the brand in the marketplace. As a result, companies, small or large, often attempt to glean and gather relevant information, or postings, from social media. This information is then analyzed, preferably with a high degree of precision, to calibrate, or fine-tune, the products, service offerings, enhancements, and/or innovations of the company. One issue, among others, in the industry is to correctly determine whether one social media posting is significantly different from another in terms of sentiment (e.g., positive, sentiment, negative sentiment and/or neutral sentiment). For example, if a baseline posting indicates a certain mode of intervention on behalf of the company (e.g., hands-on intervention), a second customer social media posting is assessed with respect to this baseline posting to recommend a different, or identical, form of intervention based on whether the difference in sentiment between postings is significant or not. Failure to correctly identify and quantify the difference costs companies money, precious resources and, most importantly, customer satisfaction.

Aspects of the present disclosure include an appreciation that many existing tools in the marketplace involve methodologies that treat social media postings as single-threaded postings. For the purposes of this disclosure a single-threaded posting is a posting where the full article, or chatter, is considered as a single thread. One shortcoming of single-threaded analysis is the lack of capability to detect any granular-level difference between two social media postings on the same topic which could lead to an almost identical response to these two very different chatters. Thus, if it is determined that a hands-on intervention approach is desirable to address a baseline posting, many known solutions produce a result which have difficulty determining whether other postings are significantly different, potentially leading to a hands-on intervention for one set of postings and insufficient remediation on a second set of postings. Such a result can cause customer satisfaction to suffer. Accordingly, the text affinity analyzer performs a multi-threaded text affinity analytics operation which compares between two communications (e.g., chatters) at a granular level and determines whether a first social media posting is significantly different from a second social media posting (e.g., a baseline posting). Such a text affinity analyzer advantageously saves money on in terms of cost avoidance and enhances customer satisfaction.

Aspects of the present disclosure include an appreciation that one key to successfully formulating a business strategy leveraging social media feedback includes analyzing the sentiment of the social media communications such as posts/chatters with respect to key words and assessing the strength of sentiment to gauge the degree of satisfaction/dissatisfaction of the customers based upon the analysis.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and a Web browser 126. In various embodiments, the system memory 112 may also comprise a text affinity analyzer module 118. In one embodiment, the information handling system 100 is able to download the Web browser 126 and the text affinity analyzer module 118 from the service provider server 142. In another embodiment, the text affinity analyzer operation is provided as a service from the service provider server 142.

Figure 2:
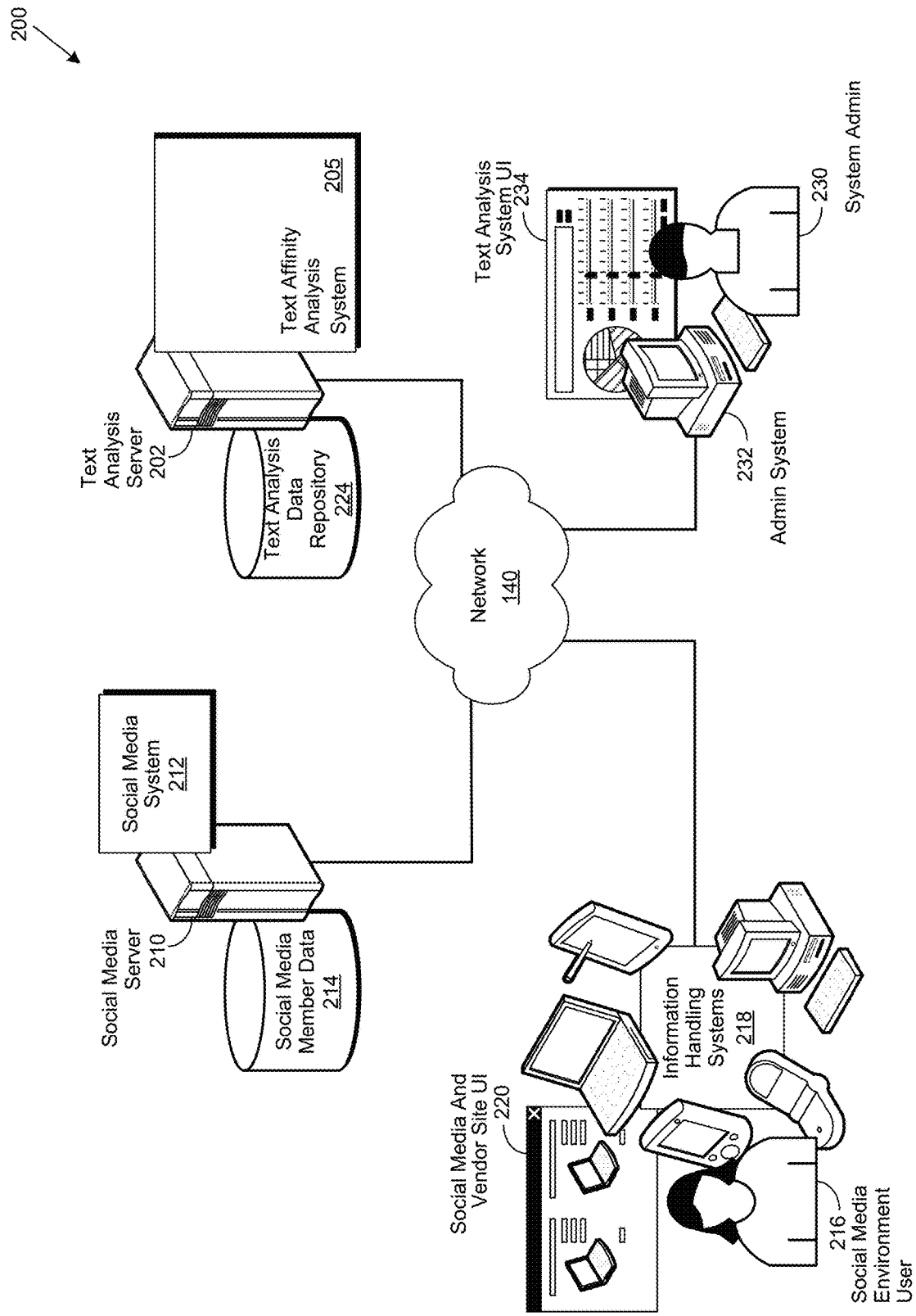
FIG. 2 is a simplified block diagram showing an implementation of an environment having a text affinity analyzer for performing communication analytics.

FIG. 2 is a simplified block diagram showing an implementation of an environment having a text affinity analyzer for performing communication analytics. In various embodiments, an algorithm is implemented with the text affinity analysis system 205 to perform a text affinity analysis operation.

In various embodiments, a text affinity analysis system 205 is implemented to monitor user social media communications and generate a text affinity analysis score based upon the social media communications. In these and other embodiments, a social media environment user 216 uses an information handling system 218 to log on to a social media environment, or site, enabled by a social media system 212, which is implemented on a social media server 210. As used herein, an information handling system 218 may comprise a personal computer, a laptop computer, or a tablet computer operable to exchange data between the social media environment user 216 and the social media server 210 over a connection to network 140. The information handling system 218 may also comprise a personal digital assistant (PDA), a mobile telephone, or any other suitable device operable to display a social media and vendor site user interface (UI) 220 and likewise operable to establish a connection with network 140. In various embodiments, the information handling system 218 is likewise operable to establish an on-line session over network 140 with the SNA system, which is implemented on an SNA server 202.

In this embodiment, text analysis operations are performed by the text affinity analysis system 205 to monitor social media communications. In one embodiment, the social media communications are monitored and collected by a social media crawler operable to perform crawling operations in a target social media environment. The collected social media communications are then stored in the text analysis data repository 224. If it is determined that an increase in social media communications related to a target subject is detected, then the social media communications related to the target subject are processed to determine whether the subject traffic is positive or negative.

If it is determined based upon the text affinity analysis that the subject traffic is negative, then it is processed by the text affinity analysis system 205 to prioritize the most negative interactions. The source(s) (e.g., social media environment user 216) of the most negative interactions are identified and they are then displayed in a text analysis system user interface (UI) 234 implemented on an administrator system 232. Once displayed, the sources are reviewed by a system administrator 230 to determine the issues causing the negative interactions. Once the issues have been determined, proactive actions are performed by the system administrator 230, or a designated system agent, to address the identified issue(s). Thereafter, the primary source(s) of the subject traffic may be contacted by the system administrator 230, or a designated system agent, to gain a better understanding of the issues causing the negative interactions. Additional proactive actions are then performed by the by the system administrator 230, or a designated SNA system agent, while tracking the results of the proactive actions and the relationship with the primary source(s) of the subject traffic.

Figure 3:
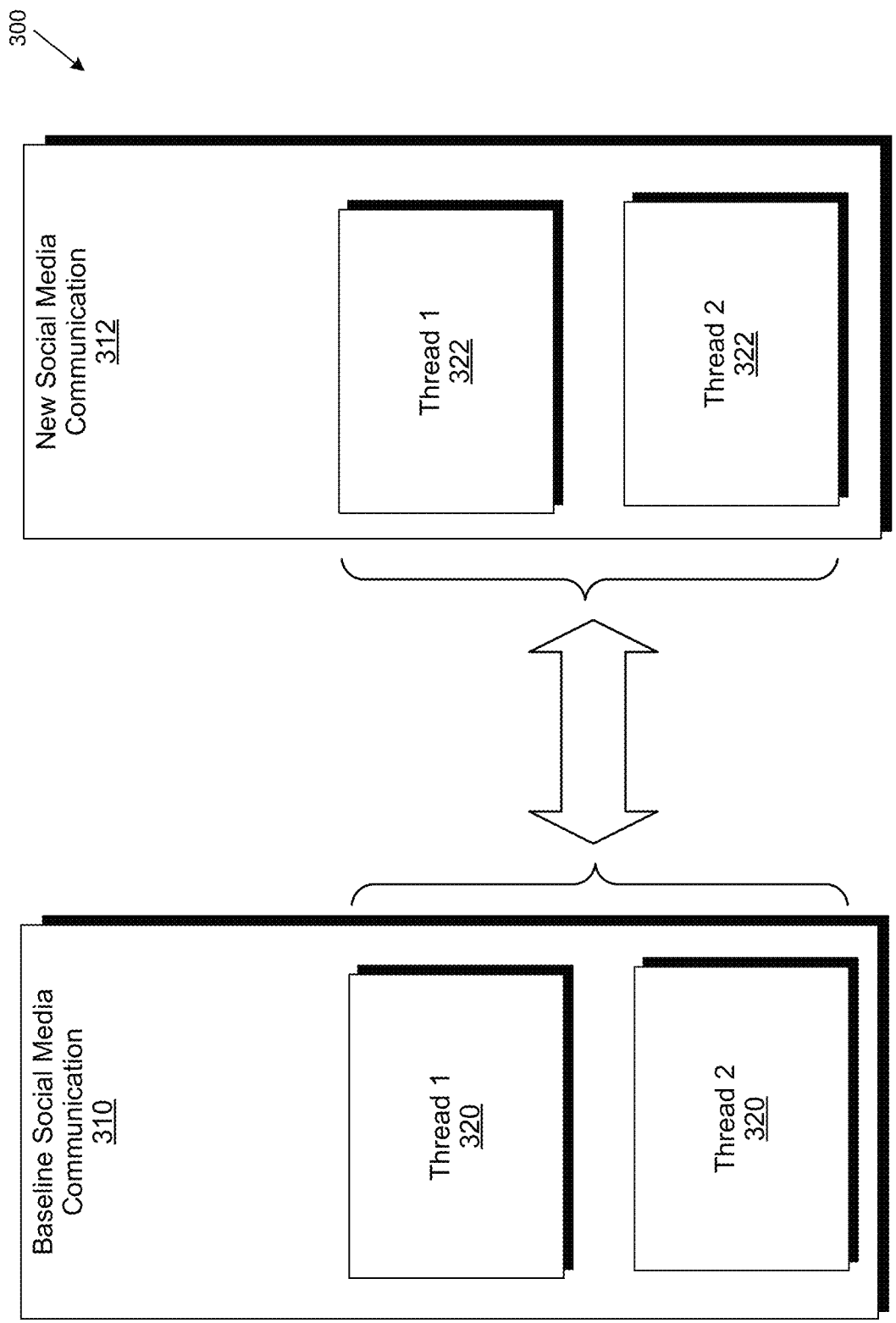
FIG. 3 is a block diagram of a text affinity analyzer operation.

FIG. 3 is a block diagram of a text affinity analyzer operation 300. More specifically, the text affinity analyzer operation performs a text affinity analysis between a first social media communication 310 (i.e., a baseline social media communication) and a second social media communication 312 (i.e., a new social media communication). For example, the first social media communication 310 might include a first social media communication along the lines of:

Purchased this unit and it had problems from the beginning. First problem was a faulty message stating that a thumb drive was installed and not working, when this was not the case as there was no such thing installed. Second was very poor scanning ability. Third is the missing printhead message that does not allow the machine to work any longer. I cleaned printheads more than 5 times. When I called customer service to advise me as to why this is happening, I was told my unit is obsolete and that a new printhead was no longer available. I was then told that even if I replaced the printhead, the contact might not work properly and will have wasted my money on it and new ink cartridges. My experience with XX has been frustrating and I do not understand why faulty products cannot be serviced and used further? Why must we waste (send to the landfill) an otherwise usable machine that cost $400 and contains so much plastic and metal material, rather than offer a replacement part? Sustainability and reliability is what XX should be looking to achieve as a reputable company. They are never going to hit that mark with their unsavory tactics.

Continuing the example, the second social media communication 312 might include a first social media communication along the lines of:

> Bought this unit and it began to stink. The unit didn't work from the beginning. I'm so frustrated that I would be cussing a lot. I tried my best, but didn't work. Tried to play with various buttons. It seems that I have wasted my money. I should have bought it from other manufacturer. I am really lost. This is quite unacceptable. The printer should have worked from the beginning. It must be defective from the scratch. Where is the quality control? It seems that they don't have any quality control. Not sure if that's the way to go and do business. Then I called at their customer reps department, I was told by an automated voice mail to wait for eternity. They are not at all helpful. This is truly a frustrating experience. When I have asked the customer representative, she gave me several advices and nothing worked. I asked if there are any tools I can use. It seems that she was clueless, not sure what to do or what to say. It's very, very frustrating. What makes me perplexed, why these customer reps don't get trained. Why are their services are so poor? Their customer service is not up to the mark. That's the area they should focus. This is pretty dismal for their business.

In certain embodiments the baseline social media communication 310 includes a baseline social media communication (i.e., baseline chatter) which can be divided into two threads 320 (Thread 1 and Thread 2). In certain embodiments, the new social media communication includes a new social media communication (i.e., new chatter) which can be divided into two threads 322 (Thread 1 and Thread 2).

In many business situations, social media communications such as social media postings can be divided into multiple threads, as compared to a single thread. In certain embodiments, it is helpful to divide the social media communication into a plurality of threads including a feedback thread as well as a customer experience thread. The feedback thread includes social media communications relating to feedback on a product purchased by the customer. The customer experience thread include social media communications relating to customer experience with technical call center professionals. Under certain scenarios, it may be helpful to divide a social media communication into as many as five or six manageable threads. While there is no rigid rule on how to form these threads, in certain embodiments, the threads are formed based upon distinct underlying sentiment types. For example, a consumer may provide feedback on a product and the related customer service in a social media post. In this feedback there may be sentiment types for each of the product portion of the social media post and the customer service portion of the social media post (e.g., the sentiment type for the product portion might be positive while the sentiment type for the customer service portion might be negative). There are two likely threads to be formed from this social media post. A thread related to the product and a thread related to the related customer service.

For example, the first thread 320 of the baseline social media communication might include a first thread having communication along the lines of:

> Purchased this unit and it had problems from the beginning. First problem was a faulty message stating that a thumb drive was installed and not working, when this was not the case as there was no such thing installed. Second was very poor scanning ability. Third is the missing printhead message that does not allow the machine to work any longer. I cleaned printheads more than 5 times.

Continuing the example, the second thread 320 of the baseline social media communication might include a first thread having communication along the lines of:

> When I called customer service to advise me as to why this is happening, I was told my unit is obsolete and that a new printhead was no longer available. I was then told that even if I replaced the printhead, the contact might not work properly and will have wasted my money on it and new ink cartridges. My experience with XX has been frustrating and I do not understand why faulty products cannot be serviced and used further? Why must we waste (send to the landfill) an otherwise usable machine that cost $400 and contains so much plastic and metal material, rather than offer a replacement part? Sustainability and reliability is what XX should be looking to achieve as a reputable company. They are never going to hit that mark with their unsavory tactics.

Continuing the example, the first thread 322 of the new social media communication might include a first thread having communication along the lines of:

> Bought this unit and it began to stink. The unit didn't work from the beginning. I'm so frustrated that I would be cussing a lot. I tried my best, but didn't work. Tried to play with various buttons. It seems that I have wasted my money. I should have bought it from other manufacturer. I am really lost. This is quite unacceptable. The printer should have worked from the beginning. It must be defective from the scratch. Where is the quality control? It seems that they don't have any quality control. Not sure if that's the way to go and do business.

Finally, the second thread 322 of the new social media communication might include a first thread having communication along the lines of:

> Then I called at their customer reps department, I was told by an automated voice mail to wait for eternity. They are not at all helpful. This is truly a frustrating experience. When I have asked the customer representative, she gave me several advices and nothing worked. I asked if there are any tools I can use. It seems that she was clueless, not sure what to do or what to say. It's very, very frustrating. What makes me perplexed, why these customer reps don't get trained. Why are their services are so poor? Their customer service is not up to the mark. That's the area they should focus. This is pretty dismal for their business.

In this example, the second social media communication may be considered as part of benchmark chatter that's used as a golden standard for hands-on intervention by technical help professionals. For the purposes of this disclosure, a golden standard may be defined as a post that is used as a baseline with respect to which other posts may be measured in terms of more positive, or negative, sentiment.

In certain embodiments, a single thread analysis may be performed on the first social media communication 310 and the second social media communication 312. The single thread analysis leverages the hypothesis testing for proportions to assess whether two social media communications (i.e., chatters) are significantly different from each other. With the single thread analysis, a proportion for each chatter is computed by determining the ratio of the number of matches for key words. In certain embodiments, key words are obtained from sentiment dictionaries that include words reflecting an underlying mood of a consumer. In certain embodiments, the sentiment dictionaries are available via open source. In certain embodiments, not all of the words are of equal values on a sentiment scale (e.g., faulty, poor, dismal, missing, bad, frustrating, frustrated, clueless, perplex, etc.) to the total number of words in the communication. As a result, a single thread analysis generates a text analysis score (i.e., a Z-score) using the following analysis:

$$z = \frac{\hat{p}_1 - \hat{p}_2}{\sqrt{\tilde{p}(1-\tilde{p})\left(\frac{1}{n_1} + \frac{1}{n_2}\right)}}$$

$$\text{where } \hat{p}_1 = \frac{x_1}{n_1},$$

with $x_1 =$

\# of key words in Chatter1 and $n_1$ = Total \# of words in Chatter1

$$\hat{p}_2 = \frac{x_2}{n_2},$$

with $x_2 =$

\# of key words in Chatter2 and $n_2$ = Total \# of words in Chatter2

$$\tilde{p} = \frac{(x_1 + x_2)}{(n_1 + n_2)}$$

Figure 4:
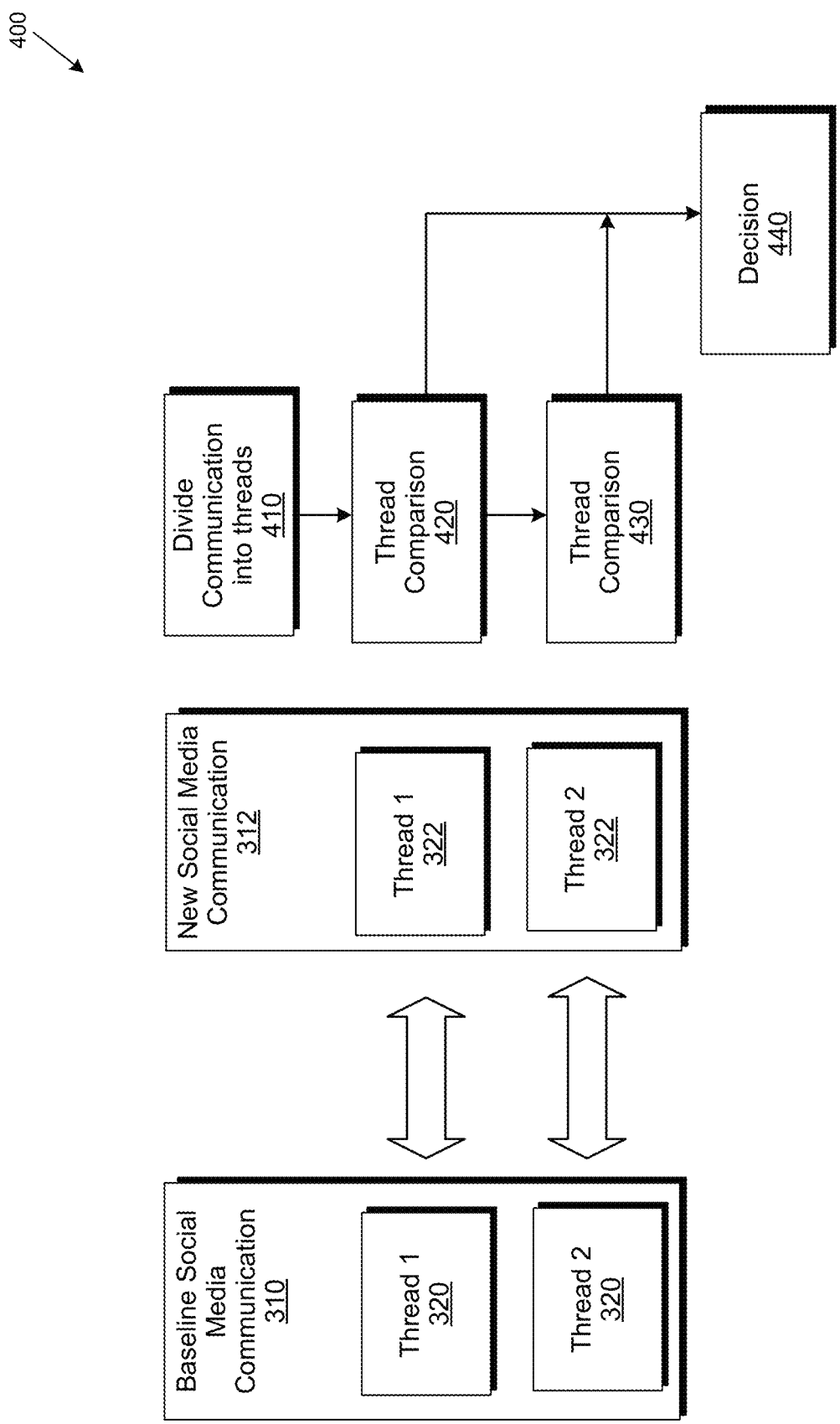
FIG. 4 is a block diagram of a multi-threaded text affinity analyzer (MTTAA) operation.

Referring to FIG. 4, a block diagram of a multi-threaded text affinity analyzer (MTTAA) operation 400 is shown. In certain embodiments, a multi-threaded text affinity analysis (MTTAA) may be performed on the first social media communication 310 and the second social media communication 312. More specifically, the multi-threaded text affinity analysis begins operation by dividing each social media communication into a plurality of threads at step 410.

A first thread comparison operation is performed at step 420. Another thread comparison operation is performed at step 430.

For each thread comparison operation 420, 430, the multi-threaded text affinity analysis generates an estimate for the statistic $z_i$, where i may range from 1 through k for a k-thread chatter.

$$z_i = \frac{\hat{p}_{i1} - \hat{p}_{i2}}{\sqrt{\tilde{p}_i(1-\tilde{p}_i)\left(\frac{1}{n_{i1}} + \frac{1}{n_{i2}}\right)}}$$

$$\text{where } \hat{p}_{i1} = \frac{x_{i1}}{n_{i1}},$$

with $x_{i1} =$

\# of key words in Chatter1 and $n_1$ = Total \# of words in Chatter1

$$\hat{p}_{i2} = \frac{x_{i2}}{n_{i2}},$$

with $x_{i2} =$

\# of key words in Chatter2 and $n_2$ = Total \# of words in Chatter2

$$\tilde{p}_i = \frac{(x_{i1} + x_{i2})}{(n_{i1} + n_{i2})}$$

The test statistic for the multi-threaded text affinity analysis is the Mahalanobis Distance (MD) which may be calculated by the analyzer as:

$$MD = \sum_{i=1}^{k} z_i^2$$

with MD following a Chi-Square Distribution with (k−1) degree of freedom. The test statistic for the multi-threaded text affinity analysis for each of the first thread comparison operation and the second thread comparison operation are then analyzed at step 440. The analysis provides a sentiment comparison between the first social media communication and the second social media communication 412. Based upon the analysis at step 440, a decision is made whether to provide a first level of intervention or a second level of intervention. In certain embodiments, the first level of intervention may include a web-based type of intervention as compared with call-based intervention or personal visit intervention.

Referring to FIG. 5, an example result 500 from a single threaded analysis is shown. With this example single threaded analysis, a test statistic z-score of −0.50187 is produced based upon a comparison between the baseline social media communication and the second social media communication. In certain embodiments, with a single threaded analysis, a test statistic might have a tolerance level of 0.10 as a standard level of significance. The threshold level represents a quantifiable value beyond which the system may conclude that the difference is truly significant. Thus, the tolerance level is similar to a margin of error in an opinion poll. For example, if candidate A is polling at four percentage points higher than candidate B but the margin of error is five percent, the difference of 4 percent is not significant. With such a tolerance level, a high level of intervention would likely be indicated to address the issue raised in the social media communications because multiple social media communications raise a similar issue and indicate a similar level of dissatisfaction. In certain embodiments, the high level of intervention might include a hands-on intervention by a customer service representative.

Referring to FIG. 6, an example result 600 from a multi-threaded analysis is shown. With this example multi-threaded text affinity analysis result, a test statistic MD score of 4.691986 is produced based upon comparisons of the multiple threads. Such a result provides a quantifiable indication that the first and second social media communications are significantly different. Using the same tolerance level of 0.10 for the multi-threaded test statistic, a lower level of intervention is indicated. In certain embodiments, the lower level of intervention might include web-based intervention rather than hands on intervention.

Performing a multi-threaded text analysis provides a plurality of advantages. For example, using a multi-threaded text analysis can provide significantly more accurate analysis of differentials between a plurality of social media communications. By providing more accurate analysis of social media communication differentials enables a determination of what level of intervention to perform based upon the social media communications.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module. Consequently, the invention is intended to be limited only by the spirit and scope of the appended claims, giving full cognizance to equivalents in all respects.

What is claimed is:

1. A computer-implementable method for analyzing text affinity among a plurality of social media communications within a social media environment, the social media environment comprising a social media system executing on hardware processor of a social media server, a text affinity analysis system executing on hardware processor of a text analysis server and an administrator information handling system, the method comprising:
   dividing via the text affinity analysis system executing on the hardware processor of the text analysis server a first social media communication into first plurality of social media communication threads received from the social media system;
   dividing via the text affinity analysis system executing on the hardware processor of the text analysis server a second social media communication into a second plurality of social media communication threads received from the social media system;
   performing via the text affinity analysis system executing on the hardware processor of the text analysis server a text affinity analysis operation between respective threads of the first plurality of social media communication threads and the second plurality of social media communication threads, the text affinity analysis operation generating a text affinity analysis score;
   determining via a hardware processor of the administrator information handling system executing on the hardware processor of the text analysis server a level of intervention to perform based upon the text affinity analysis operation; and
   performing an intervention in response to determining the level of intervention to perform, the intervention being performed via a text analysis system user interface implemented on the administrator information handling system, the intervention comprising performing at least one of a first level intervention and a second level intervention, the first level intervention comprising performing a web-based type of intervention, the web-based type of intervention being performed via the text analysis system user interface, the second level of intervention comprising performing a hands-on type of intervention, the second level of intervention being performed in response to an indication to perform the second level of intervention via the text analysis system user interface; and wherein
   the text affinity analysis score is based upon a Mahalanobis Distance (MD) between respective threads of the first plurality of social media communication threads and the second plurality of social media communication threads.

2. The method of claim 1, wherein:
the level of intervention to perform is based upon the text affinity analysis score.

3. The method of claim 2, wherein:
a text affinity analysis score less than a predetermined amount increases the level of intervention to perform.

4. The method of claim 1, wherein:
the first thread of the first social media communication comprises a first feedback thread;
the second thread of the first social media communication comprises a first customer experience thread;
the first thread of the second social media communication comprises a second feedback thread;
the second thread of the second social media communication comprises a second customer experience thread.

5. The method of claim 1, wherein:
the text affinity analysis operation identifies key words in each of the threads of the first plurality of social media communication threads and the second plurality of social media communication threads.

6. A system comprising:
a processor;
a data bus coupled to the processor; and
a computer-usable medium embodying computer program code, the computer-usable medium being coupled to the data bus, the computer program code interacting with a plurality of computer operations for near-real-time competitive insights associated with user interactions within a social media environment the social media environment comprising a social media system executing on hardware processor of a social media server, a text affinity analysis system executing on hardware processor of a text analysis server and an administrator information handling system, the plurality of computer operations comprising instructions executable by the processor and configured for:
   dividing via the text affinity analysis system executing on the hardware processor of the text analysis server a first social media communication into first plurality of social media communication threads received from the social media system;
   dividing via the text affinity analysis system executing on the hardware processor of the text analysis server a second social media communication into a second plurality of social media communication threads received from the social media system;
   performing via the text affinity analysis system executing on the hardware processor of the text analysis server a text affinity analysis operation between respective threads of the first plurality of social media communication threads and the second plurality of social media communication threads, the text affinity analysis operation generating a text affinity analysis score;

determining via a hardware processor of the administrator information handling system a level of intervention to perform based upon the text affinity analysis operation; and performing an intervention in response to determining the level of intervention to perform, the intervention being performed via a text analysis system user interface implemented on the administrator information handling system, the intervention comprising performing at least one of a first level intervention and a second level intervention, the first level intervention comprising performing a web-based type of intervention, the web-based type of intervention being performed via the text analysis system user interface, the second level of intervention comprising performing a hands-on type of intervention, the second level of intervention being performed in response to an indication to perform the second level of intervention via the text analysis system user interface; and wherein the text affinity analysis score is based upon a Mahalanobis Distance (MD) between respective threads of the first plurality of social media communication threads and the second plurality of social media communication threads.

7. The system of claim 6, wherein:
the level of intervention to perform is based upon the text affinity analysis score.

8. The system of claim 7, wherein:
a text affinity analysis score less than a predetermined amount increases the level of intervention to perform.

9. The system of claim 6, wherein:
the first thread of the first social media communication comprises a first feedback thread;
the second thread of the first social media communication comprises a first customer experience thread;
the first thread of the second social media communication comprises a second feedback thread;
the second thread of the second social media communication comprises a second customer experience thread.

10. The system of claim 6, wherein:
the text affinity analysis operation identifies key words in each of the threads of the first plurality of social media communication threads and the second plurality of social media communication threads.

11. A non-transitory, computer-readable medium embodying computer program code for near-real-time competitive insights associated with user interactions within a social media environment the social media environment comprising a social media system executing on hardware processor of a social media server, a text affinity analysis system executing on hardware processor of a text analysis server and an administrator information handling system, the computer program code comprising computer executable instructions configured for:

dividing via the text affinity analysis system executing on the hardware processor of the text analysis server a first social media communication into first plurality of social media communication threads;

dividing via the text affinity analysis system executing on the hardware processor of the text analysis server a second social media communication into a second plurality of social media communication threads;

performing via the text affinity analysis system executing on the hardware processor of the text analysis server a text affinity analysis operation between respective threads of the first plurality of social media communication threads and the second plurality of social media communication threads, the text affinity analysis operation generating a text affinity analysis score;

determining via a hardware processor of the administrator information handling system executing on the hardware processor of the text analysis server a level of intervention to perform based upon the text affinity analysis operation; and performing an intervention in response to determining the level of intervention to perform, the intervention being performed via a text analysis system user interface implemented on the administrator information handling system, the intervention comprising performing at least one of a first level intervention and a second level intervention, the first level intervention comprising performing a web-based type of intervention, the web-based type of intervention being performed via the text analysis system user interface, the second level of intervention comprising performing a hands-on type of intervention, the second level of intervention being performed in response to an indication to perform the second level of intervention via the text analysis system user interface; and wherein the text affinity analysis score is based upon a Mahalanobis Distance (MD) between respective threads of the first plurality of social media communication threads and the second plurality of social media communication threads.

12. The non-transitory, computer-readable medium of claim 11, wherein:
the level of intervention to perform is based upon the text affinity analysis score.

13. The non-transitory, computer-readable medium of claim 12, wherein:
a text affinity analysis score less than a predetermined amount increases the level of intervention to perform.

14. The non-transitory, computer-readable medium of claim 11, wherein:
the first thread of the first social media communication comprises a first feedback thread;
the second thread of the first social media communication comprises a first customer experience thread;
the first thread of the second social media communication comprises a second feedback thread;
the second thread of the second social media communication comprises a second customer experience thread.

15. The non-transitory, computer-readable medium of claim 11, wherein:
the text affinity analysis operation identifies key words in each of the threads of the first plurality of social media communication threads and the second plurality of social media communication threads.

16. The non-transitory, computer-readable medium of claim 11, wherein the computer executable instructions are deployable to a client computer from a server at a remote location.

17. The non-transitory, computer-readable medium of claim 11, wherein the computer executable instructions are provided by a service provider to a user on an on-demand basis.

* * * * *